United States Patent
Nasiri Khormuji

(10) Patent No.: US 10,098,117 B2
(45) Date of Patent: Oct. 9, 2018

(54) TRANSMISSION AND RECEIVING METHOD IN A WIRELESS COMMUNICATION SYSTEM

(71) Applicant: Huawei Technologies Co., Ltd., Shenzhen (CN)

(72) Inventor: Majid Nasiri Khormuji, Kista (SE)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/099,170

(22) Filed: Apr. 14, 2016

(65) Prior Publication Data

US 2016/0234844 A1 Aug. 11, 2016

Related U.S. Application Data

(63) Continuation of application No. PCT/EP2013/071877, filed on Oct. 18, 2013.

(51) Int. Cl.
*H04W 72/04* (2009.01)
*H04J 3/00* (2006.01)
(Continued)

(52) U.S. Cl.
CPC ...... *H04W 72/0453* (2013.01); *H04B 7/0413* (2013.01); *H04J 3/00* (2013.01);
(Continued)

(58) Field of Classification Search
None
See application file for complete search history.

(56) References Cited

U.S. PATENT DOCUMENTS

| 2003/0156603 A1* | 8/2003 | Rakib | H03M 13/256 370/485 |
|---|---|---|---|
| 2004/0001429 A1 | 1/2004 | Ma et al. | |

(Continued)

FOREIGN PATENT DOCUMENTS

| CN | 101242257 A | 8/2008 |
|---|---|---|
| CN | 101897186 A | 11/2010 |

(Continued)

OTHER PUBLICATIONS

3rd Generation Partnership Project; Technical Specification Group Radio Access Network; Evolved Universal Terrestrial Radio Access (E-UTRA); Physical Channels and Modulation (Release 8), 3GPP TS 36.211 V8.4.0, Sep. 2008, pp. 1-78.

(Continued)

*Primary Examiner* — Derrick W Ferris
*Assistant Examiner* — Manuel Rangel
(74) *Attorney, Agent, or Firm* — Slater Matsil, LLP

(57) ABSTRACT

A method and a device for transmitting and receiving data in a wireless communication system are disclosed. In an embodiment the method includes receiving transmission data, dividing the received transmission data into K>1 data streams, where K is a positive integer, feeding each data stream into its associated parallel processing path so as to obtain K modulated data packets j=1, . . . , K from the parallel processing paths, wherein in each processing path the method further includes segmenting the data stream, encoding the segmented data stream with a first error detection code and modulating the error detection encoded segmented data stream so as to obtain a modulated data packet j comprising a plurality of modulated symbols. The method further includes multiplexing the K modulated data packets so that at least one modulated symbol of each (Continued)

modulated data packet j are placed in proximity to each other in time and/or frequency.

16 Claims, 13 Drawing Sheets

(51) Int. Cl.

| | |
|---|---|
| *H04L 1/00* | (2006.01) |
| *H04L 1/18* | (2006.01) |
| *H04L 5/00* | (2006.01) |
| *H04L 25/02* | (2006.01) |
| *H04L 1/20* | (2006.01) |
| *H04J 11/00* | (2006.01) |
| *H04B 7/0413* | (2017.01) |
| *H04W 72/12* | (2009.01) |
| *H04L 27/26* | (2006.01) |

(52) U.S. Cl.
CPC ............ *H04J 11/00* (2013.01); *H04J 11/004* (2013.01); *H04L 1/0042* (2013.01); *H04L 1/0061* (2013.01); *H04L 1/0066* (2013.01); *H04L 1/0078* (2013.01); *H04L 1/0086* (2013.01); *H04L 1/18* (2013.01); *H04L 1/1864* (2013.01); *H04L 1/1867* (2013.01); *H04L 1/208* (2013.01); *H04L 5/005* (2013.01); *H04L 5/0044* (2013.01); *H04L 5/0048* (2013.01); *H04L 25/0236* (2013.01); *H04W 72/1226* (2013.01); *H04L 25/0238* (2013.01); *H04L 27/2647* (2013.01)

(56) References Cited

U.S. PATENT DOCUMENTS

| | | | |
|---|---|---|---|
| 2005/0069020 A1 | 3/2005 | Lakkis | |
| 2005/0213682 A1 | 9/2005 | Han et al. | |
| 2007/0110135 A1 | 5/2007 | Guess et al. | |
| 2008/0187005 A1 | 8/2008 | Chauviere et al. | |
| 2010/0166118 A1* | 7/2010 | Mantravadi | H04L 25/022 375/340 |
| 2010/0246719 A1 | 9/2010 | Ko et al. | |
| 2012/0014347 A1* | 1/2012 | Tanaka | H04L 1/0007 370/329 |
| 2012/0250788 A1* | 10/2012 | Walton | H04B 7/0417 375/295 |
| 2013/0003760 A1* | 1/2013 | Schwager | H04L 5/0023 370/537 |
| 2013/0128940 A1* | 5/2013 | Mergen | H04B 1/71072 375/227 |
| 2013/0129003 A1* | 5/2013 | Ohta | H04B 7/0689 375/267 |
| 2014/0044094 A1* | 2/2014 | Vijayan | H04B 7/12 370/330 |
| 2014/0112412 A1* | 4/2014 | Ko | H04L 5/0053 375/295 |
| 2015/0334421 A1* | 11/2015 | Deiss | H04N 19/30 375/240.27 |

FOREIGN PATENT DOCUMENTS

| | | |
|---|---|---|
| CN | 101951359 A | 1/2011 |
| CN | 102857284 A | 1/2013 |
| EP | 1520385 A1 | 4/2005 |

OTHER PUBLICATIONS

Biglieri, E. et al., "Fading Channels: Information-Theoretic and Communications Aspects," IEEE Transactions on Information Theory, Oct. 1998, pp. 2619-2692, vol. 44, No. 6.

Abou-Faycal, I. et al., "Binary Adaptive Coded Pilot Symbol Assisted Modulation Over Rayleigh Fading Channels Without Feedback," IEEE Transactions on Communications, Jun. 2005, pp. 1036-1046, vol. 53, No. 6.

Gursoy, M., "On the Capacity and Energy Efficiency of Training-Based Transmissions Over Fading Channels," IEEE Transactions on Information Theory, Oct. 2009, pp. 4543-4567, vol. 55, No. 10.

Hassibi, B. et al., "How Much Training is Needed in Multiple-Antenna Wireless Links?," IEEE Transactions on Information Theory, Apr. 2003, pp. 951-963, vol. 49, No. 4.

Jindal, N. et al., "A Unified Treatment of Optimum Pilot Overhead in Multipath Fading Channels," IEEE Transactions on Communications, Oct. 2010, pp. 2939-2948, vol. 58, No. 10.

Marzetta, T., "Blast Training: Estimating Channel Characteristics for High Capacity Space-Time Wireless," Proceedings 37th Annual Allerton Conference on Communication, Control, and Computing, Sep. 22-24, 1999, pp. 1-9, Monticello, IL.

Yoo, T. et al., "Capacity and Power Allocation for Fading MIMO Channels With Channel Estimation Error," IEEE Transactions on Information Theory, May 2006, pp. 2203-2214, vol. 52, No. 5.

\* cited by examiner

TRANSMISSION AND RECEIVING METHOD IN A WIRELESS COMMUNICATION SYSTEM

CROSS-REFERENCE TO RELATED APPLICATIONS

This application claims the benefit of International Application No. PCT/EP2013/071877, filed on Oct. 18, 2013, which is hereby incorporated herein by reference.

TECHNICAL FIELD

The present patent application relates to a transmission method and a corresponding receiving method in a wireless communication system. Furthermore, the patent application also relates to a transmission device, a receiving device, a computer program, and a computer program product thereof.

BACKGROUND

In wireless communications the channel between the network nodes (e.g., terminals, base stations, access points, remote radio heads, user equipments, etc.) varies over time and frequency. The receivers at the receiving nodes are arranged in a way to be able to track the radio channel variations in the time-frequency grid over which the data is transmitted. In most cases, the receiver structure is optimized by assuming that the perfect channel state information (CSI) (i.e. the channel gain) or an estimate of the CSI with sufficiently high fidelity is available at the receiver side.

This assumption leads to several important consequences in order to design the transmitter-receiver chain. Most notably, under the assumption of perfect CSI, a receiver that employs the nearest-neighbour decoding, is optimal which allows the system operates to its theoretical performance limit. With the nearest-neighbour decision rule, the decoder attempts to choose a codeword which is closest to the received noisy signal vector (i.e., sampled base band signals) in some norms, for example Euclidean distance for Gaussian channels or Hamming distance for binary channels. This decoding rule requires the decoder to scale the transmitted codeword with the channel gain. In practice the channel gain is not available beforehand and should be learned. The CSI can be learned either implicitly or explicitly from the received noisy signals.

Channel estimation is a crucial component in the receiver chain for coherent data transmission and detection. The coherent reception means that the receiver can compensate for the phase rotation and magnitude amplifications of the transmitted modulated symbols. The channel estimation enables the receiver to track the received coded and modulated signal. This approach generally results in a simpler modular system design for data detection at the receiver side: channel estimation followed by data detection. To furnish the channel estimation at the receiver, some pre-specified transmission symbols, referred to as pilot or reference symbols, are multiplexed with data symbols (i.e. information-bearing symbols) at the transmitter. That is, the transmission of each block of coded symbols is divided into sub-blocks such that over each sub-block the transmitter consumes resources for learning the channel as well as transmitting data.

The receiver using the known transmitted pilot symbols estimates the channel gain between transmit and receive antennas. Thereafter, the estimated channel is utilized to perform decoding of the received data packet. Pilot transmission is of common practice in many standardized wireless communication systems, for example that of Long Term Evolution (LTE). In general, this method of data transmission and reception is referred to as pilot-assisted communications.

For example, the pilot symbols in LTE are distributed in the time-frequency grid of the radio resources. The location (i.e., time-frequency mapping) and value of the pilot symbols are pre-specified in each system such as in LTE. The receiver using the knowledge of the transmitted pilot symbols and the associated time-frequency mapping finds the equivalent complex channel (i.e. phase rotation and magnitude amplification) that affected the transmitted pilot symbols. These estimated channels are then utilized to estimate the channel gain affecting the transmitted data symbols. This step is generally performed by interpolation of the estimated channel over the pilot symbols.

The pilot-assisted communication, despite its simple implementation, suffers from two main issues: loss in the spectral efficiency due the transmission of pilot symbols and propagation of the channel estimation errors to the decoder at the receiver.

FIG. 1 illustrates the conventional pilot-assisted transmitter chain. At the transmitter the transmission data (i.e., raw information bits) generated by a communication source are grouped using the segmentation block and then additional bits in form of for example cyclic redundancy check (CRC) are added to each information block. Then each information block are passed to a channel encoder to generate a packet of coded bits. The shown encoder block in FIG. 1 typically consists of a mother error correction coder followed by rate matching and possibly a bit-interleaver. The coded information bits are next passed to a modulator to produce coded symbols. Finally, the coded symbols are multiplexed with predefined pilot symbols and then mapped to time-frequency resource elements using a multiplexer to be transmitted over the physical channel. The rate-matching is used to allow the flexibly to match the coded information bits to the number available resources at the transmitter. The main purpose of the CRC is to enable the receiver to verify whether the decoded packet is correct or not. In case, the added CRC does not correctly check after the decoding, the receiver may initiate a Negative Acknowledgment (NACK) signal to notify the transmitter that the decoded packet is erroneous. Having received the NACK signal, the transmitter may retransmit the packet.

FIG. 2 depicts a receiver for pilot-assisted communications. Since the receiver knows how the pilot and data symbols are mapped to the physical recourses, it can de-multiplex the received noisy signals associated with the transmitted pilot and data symbols. The received noisy signals associated with the transmitted pilot symbols are passed to the channel estimator that produces an estimate of the channel gain by utilizing the fact that it knows which pilot symbol are transmitted. Two typical examples of the channel estimators include maximum likelihood (ML) estimator and minimum mean square error (MMSE) estimator. The estimated channels are then passed to the decoder to perform decoding. For example, for iterative decoders, the estimated channel gains at the decoder are used to compute look-likelihood ratios (LLR) of transmitted bits using the received noisy data signals.

The purpose of transmitting pilot symbols is to enable the receiver to track the time-varying radio channel. The estimated channel gain can be used as side-information which allows the decoder to have an estimate of the received signals which is a noisy version of the transmitted coded modulated symbol perturbed by a phase rotation and magnitude amplification. For the time-varying channel, the received constellation is in general a scaled and rotated version of the transmitted signal constellation. The knowledge of the channel gain hence let the decoder operate with a lower block error rate (BLER) as compared to the case when there is no knowledge of the channel gain available prior to the decoding. The performance of the decoder for a given encoder-decoder pair depends on the quality of the channel estimator. The better the channel estimate is, the lower the BLER becomes which leads to a higher quality of service. The ultimate performance for a given encoder-decoder setup is to have a performance very close to the case with the perfect knowledge of the channel. However, in practice there is a loss in performance since the channel estimates might not be close to the true channel due the estimation noise. The channel estimation noise propagates to the decoder and this reduces the end-to-end performance.

Therefore, there is a need to design a communication system that generates channel estimation gains that does not deviate from the true channel gain experienced by the transmitted data. The imperfect channel estimation at the receiver degrades the performance of communication systems. The channel estimation noise; i.e. the estimation noise resulted for a channel estimator using the transmitted pilot symbols, propagates to the demodulator/decoder and spatial filters in case of Multiple-Input Multiple-Output, MIMO, links. The estimation noise reduces end-to-end performance, for example block error rate (BLER) or bit error rate (BER) for a given spectral efficiency or the maximum achievable spectral efficiency for given BLER or BER.

Several interesting results are reported by different researchers indicating a notable spectral efficiency loss as compared to that with perfect channel state information at the receiver. As a remedy, two main approaches are generally practiced: balancing the number of pilot and data symbols and optimizing the power allocation among these symbols. Both approaches only partially recover the spectral efficiency loss as compared to the case with perfect CSI. To resolve the channel estimation noise three main prior art solutions are considered.

Power Boosting

With power boosting, the transmitter transmits the pilot symbols with higher average power. This leads to lower channel estimation noise at the receiver. However, this strategy consumes power and is not suitable for the systems with limited peak-power constraints as most systems have a peak power constraint on the transmitted symbols. In addition to this drawback, the pilots with higher power in multi-user setups leads to a severe interference from the neighbouring transmitters when they transmit their pilot symbols or data symbols over the same time-frequency resource elements. One example is the pilot contamination which results from the interferences from the pilot symbols transmitted over the same time-frequency resource. Finally, for fast-varying channels the estimated channel gain using the pilot gets out-dated and hence the estimated channel gains become uncorrelated with the true one affecting the transmitted data symbols regardless how high the transmitted power of the pilot symbol is set.

Denser Pilot Transmissions

Alternatively, the transmitter can multiplex a higher number of pilot symbols for a given resource block. This solution also improves the quality of the channel estimation (i.e., it reduces the channel estimation noise) and is suitable for channels that vary fast since it produces the estimates that are more correlated to the actual channel gains experienced by the transmitted data symbols. The main shortcoming of this solution is that it reduces the spectral efficiency of the transmission as it consumes additional time-frequency resource elements for pilot transmission, which could be utilized for the data transmission.

Iterative Estimation-Decoding

Another way to improve the channel estimation quality is to use iterative demodulation/decoding and channel estimation. This type of strategy is suitable for decoders that are designed in an iterative manner. For such receivers, the decoder feedbacks its estimates of the data to the channel estimator and the channel estimators updates its estimate to be used by the decoder to update the log-likelihood ratio (LLR) values, see the dashed feedback from the decoder to the channel estimator in FIG. 2. This solution does not consume any physical resources but increases the complexity of the decoding as it requires additional outer loop iterations. More importantly, this solution suffers from error propagation since the feedback signals from the decoder are still noisy as the decoding is not yet completed. Finally, this solution may not be feasible for all type of decoders, for example those decoders that process the received noisy packet once and are not arranged for iterative estimation or those decoders that are designed to function using other metrics.

SUMMARY

Embodiments of the invention provide a method for improved channel estimation in a wireless communication system.

According to a first aspect of the embodiments of the invention the transmission method in a wireless communication system comprises the following steps receiving transmission data, dividing the received transmission data into K>1 number of data streams, where K is a positive integer, feeding each data stream into its associated parallel processing path so as to obtain K number of modulated data packets j=1, . . . , K from the parallel processing paths, wherein each processing path involves the processing steps of: segmenting the data stream, encoding the segmented data stream with a first error detection code, and modulating the error detection encoded segmented data stream so as to obtain a modulated data packet j comprising a plurality of modulated symbols; multiplexing the K number of modulated data packets so that at least one modulated symbol of each modulated data packet j are placed in proximity to each other in time and/or frequency; and transmitting the multiplexed modulated data packets over a radio channel of the wireless communication system.

According to an embodiment of the method, each processing path further involves the processing step of: encoding the error detection encoded segmented data stream with an error correction code.

According to another embodiment of the method, the step of multiplexing further involves: multiplexing the modulated symbols of the K number of modulated data packets together with a plurality of channel estimation pilot symbols. According to this embodiment the plurality of pilot symbols are multiplexed in proximity to the modulated symbols of the K number of modulated data packets.

According to yet another embodiment of the method, proximity means the same coherence time $T_c$ and/or the same coherence bandwidth $B_c$ of the radio channel.

According to yet another embodiment of the method, the wireless communication system is a Single-Carrier Time-Multiplexing, SCTM, system, and at least one pilot symbol and at most $T_c-1$ number of modulated symbols belongs to different modulated data packets.

According to yet another embodiment of the method, the wireless communication system is a Multi-Carrier Time-frequency Multiplexing, MCTFM, system and at least one pilot symbol and at most $B_cT_c-1$ number of modulated symbols belongs to different modulated data packets.

According to yet another embodiment of the method, the step of multiplexing involves placing at least one modulated symbol from modulated data packet j in proximity to at least one modulated symbol of each modulated data packets 1 to j−1.

According to yet another embodiment of the method, the method further comprises, before the step of dividing, the step of encoding the received transmission data with a second error detection code.

According to yet another embodiment of the method, the first and/or the second error detection code is a Cyclic Redundancy Check, CRC, code.

According to yet another embodiment of the method, the multiplexed modulated data packets are transmitted over a Multiple-Input Multiple-Output, MIMO channel.

According to yet another embodiment of the method, the transmission rate for modulated data packets j increases with increasing value for j. According to this embodiment increased transmission rate is achieved by one or more methods in the group comprising: changing rate of the error correction code, performing rate matching, and changing the modulation order.

According to a second aspect of the embodiments of the invention a receiving method in a wireless communication system comprises the steps of: receiving at least one communication signal comprising multiplexed modulated data packets according to any of the preceding claims; demultiplexing the multiplexed modulated data packets so as to obtain K number of modulated data packets; and for the received modulated data packets j=1 to K: demodulating and detecting the jth modulated data packet so as to obtain the jth data packet, checking whether the jth data packet is a correct data packet by an error detection check, and if the jth data packet is correct, re-modulating the jth data packet and using at least one of the re-modulated jth data packet, for j=2 to K, for channel estimation, demodulation and detection of the (j+1)th modulated data packet.

According to an embodiment of the method, the multiplexed modulated data packets are encoded with an error correction code, and the step of re-modulating involves re-modulating and re-encoding the jth data packet and using the re-modulated and the re-encoded jth data packet for channel estimation, demodulation and detection of the (j+1)th modulated data packet.

According to another embodiment of the method, if the jth data packet is not a correct data packet the method further comprises the step of initiating Automatic Repeat Request, ARQ, for the jth data packet.

According to a third aspect of the embodiments of the invention the transmission and receiving method in a wireless communication system comprises the steps of receiving transmission data by a transmitter; dividing the received transmission data, by said transmitter, into K>1 number of data streams, where K is a positive integer; feeding each data stream, by said transmitter, into its associated parallel processing path so as to obtain K number of modulated data packets j=1, . . . , K from the parallel processing paths, wherein each processing path involves the processing steps of: segmenting the data stream, encoding the segmented data stream with a first error detection code, and modulating the error detection encoded segmented data stream so as to obtain a modulated data packet j comprising a plurality of modulated symbols; multiplexing, by said transmitter, the K number of modulated data packets so that at least one modulated symbol of each modulated data packet j are placed in proximity to each other in time and/or frequency; transmitting, by said transmitter, the multiplexed modulated data packets over a radio channel of the wireless communication system; receiving, by a receiver, at least one communication signal comprising the multiplexed modulated data packets; demultiplexing, by said receiver, the multiplexed modulated data packets so as to obtain K number of modulated data packets; and for the received modulated data packets j=1 to K: demodulating and detecting the jth modulated data packet so as to obtain the jth data packet, checking whether the jth data packet is a correct data packet by an error detection check, and if the jth data packet is correct, re-modulating the jth data packet and using at least one of the re-modulated jth data packet, for j=2 to K, for channel estimation, demodulation and detection of the (j+1)th modulated data packet.

According to a fourth aspect of the embodiments of the invention the transmission device for communication in a wireless communication system comprises a processor configured to: receive transmission data; divide the received transmission data into K>1 number of data streams, where K is a positive integer; feed each data stream into its associated parallel processing path so as to obtain K number of modulated data packets j=1, . . . , K from the parallel processing paths, wherein each processing path involves the processing steps of: segment the data stream, encode the segmented data stream with a first error detection code, and modulate the error detection encoded segmented data stream so as to obtain a modulated data packet j comprising a plurality of modulated symbols; multiplex the K number of modulated data packets so that at least one modulated symbol of each modulated data packet j are placed in proximity to each other in time and/or frequency; and transmit the multiplexed modulated data packets over a radio channel of the wireless communication system.

According to a fifth aspect of the embodiments of the invention the receiving device for communication in a wireless communication system comprises a processor configured to: receive at least one communication signal comprising multiplexed modulated data packets according to any of the preceding claims; demultiplex the multiplexed modulated data packets so as to obtain K number of modulated data packets; and for the received modulated data packets j=1 to K: demodulate and detecting the jth modulated data packet so as to obtain the jth data packet, check whether the jth data packet is a correct data packet by an error detection check, and if the jth data packet is correct, re-modulate the jth data packet and using at least one of the re-modulated jth data packet for channel estimation, demodulation and detection of the (j+1)th modulated data packet.

Embodiments of the present patent application provide a solution which enables progressively enhancing the qualities of the channel estimation at the receiver by sequential estimation. This improvement, in contrast to prior art, is introduced without consuming additional power, transmitting additional legacy pilot symbols which may be optional though, and error propagation.

Embodiments of the present patent application are suitable for both low- and fast-varying radio channels. The patent application does not increase the complexity of the decoding per transmitted data packets and furnishes a flexible radio communications. In addition, the present method provides a mechanism to reduce the overhead due to the legacy pilot signals and even complete removal of the legacy pilot signals.

Further applications and advantages of the patent application will be apparent from the following detailed description.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF ILLUSTRATIVE EMBODIMENTS

Figure 1:
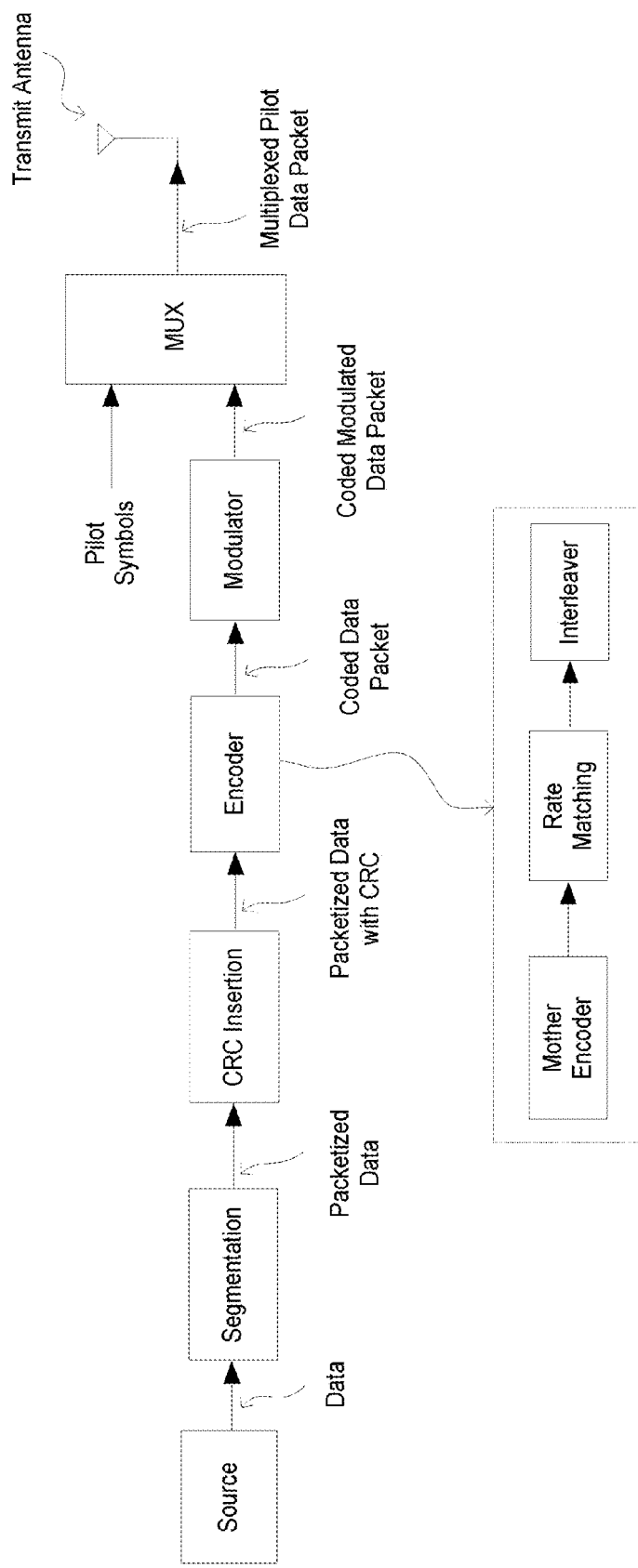
FIG. 1 illustrates a block diagram of a prior art transmitter in a conventional pilot-assisted communication system.
Figure 2:
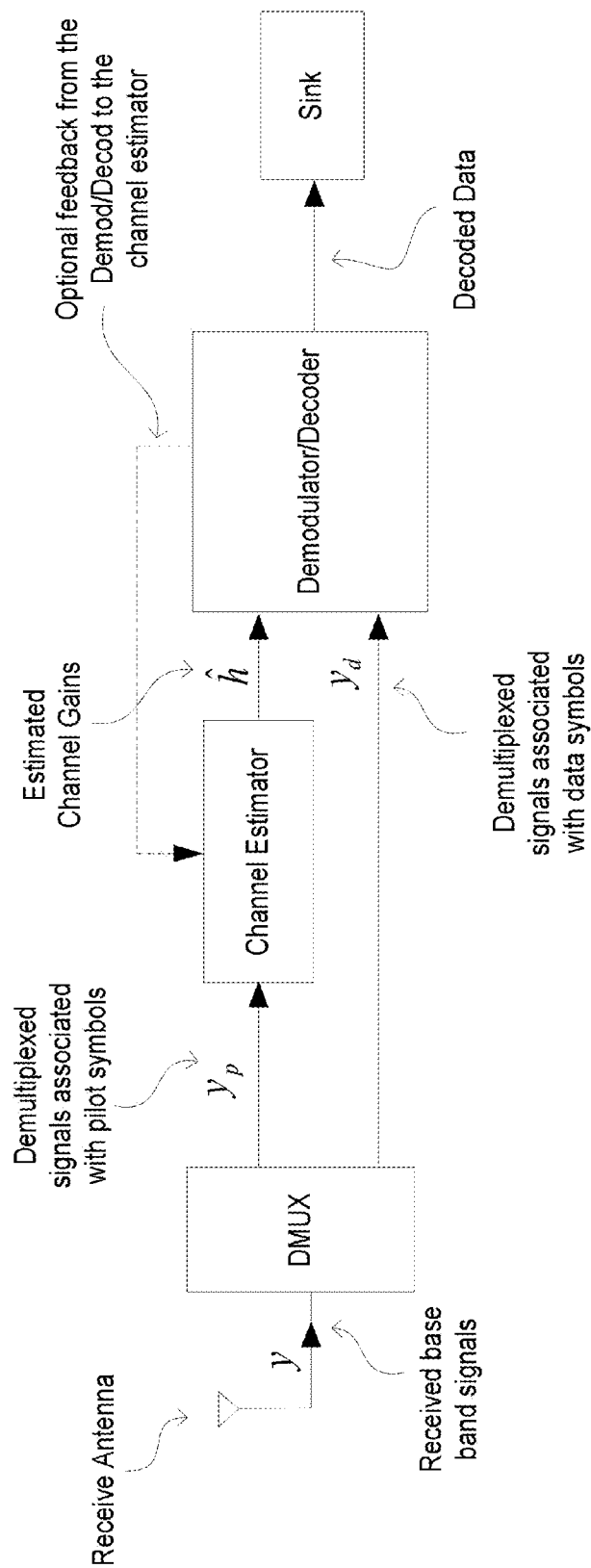
FIG. 2 illustrates a block diagram of a prior art receiver in a conventional pilot-assisted communication system.

At the transmitter side two main components are combined before transmission according to the present patent application, namely: parallel encoding streams and multiplexing. By the parallel encoding and multiplexing according to the patent application the sequential estimation at the receiver is possible and provides superior estimations compared to prior art methods.

Transmission data for transmission in a wireless communication is received and divided into K>1 number of data streams, where K is a positive integer. The different data streams are fed to each associated parallel processing path so that the output is K number of modulated data packets having indices j=1, . . . , K. Each processing stream involves: segmenting the data stream, encoding the segmented data stream with a first error detection code, and modulating the error detection encoded segmented data stream so as to obtain a modulated data packet j comprising a plurality of modulated symbols. Thereafter, the K number of modulated data packets are multiplexed so that at least one modulated symbol of each modulated data packet j are placed in proximity to each other in time and/or frequency. This step of multiplexing is very important in the present method. Finally, the multiplexed modulated data packets are transmitted over a radio channel of the wireless communication system which e.g. can be a cellular system, such as 3GPP system or any other suitable communication system. The transmission may also be performed over a MIMO channel which means that the transmitter is properly arranged for such transmissions.

At the receiver the multiplexed modulated data packets from the transmitter is received in one or more communication signals. The multiplexed modulated data packets are demultiplexed so that the K number of modulated data packets is obtained. Thereafter, the sequential channel estimation is performed, i.e.; for the received modulated data packets j=1 to K: demodulating and detecting the jth modulated data packet so as to obtain the jth data packet, checking whether the jth data packet is a correct data packet by an error detection check, and if the jth data packet is correct, re-modulating the jth data packet and using at least one of the re-modulated jth and previous (for 1, . . . , j−1) data packets for channel estimation, demodulation and detection of the (j+1)th modulated data packet. Hence, in other words at least a sub-set containing at least one modulated symbol of the previously demodulated and correctly detected packets at stage j for j=2 to K may be used for channel estimation which substantially improves the estimation of the radio channel. This implies that modulated symbols belonging to different previously demodulated and correctly detected packets can be combined for channel estimation according to an embodiment of the patent application. However, for improved performance all prior demodulated and detected packet at stage j are used as channel estimations according to another embodiment of the patent application.

Figure 3:
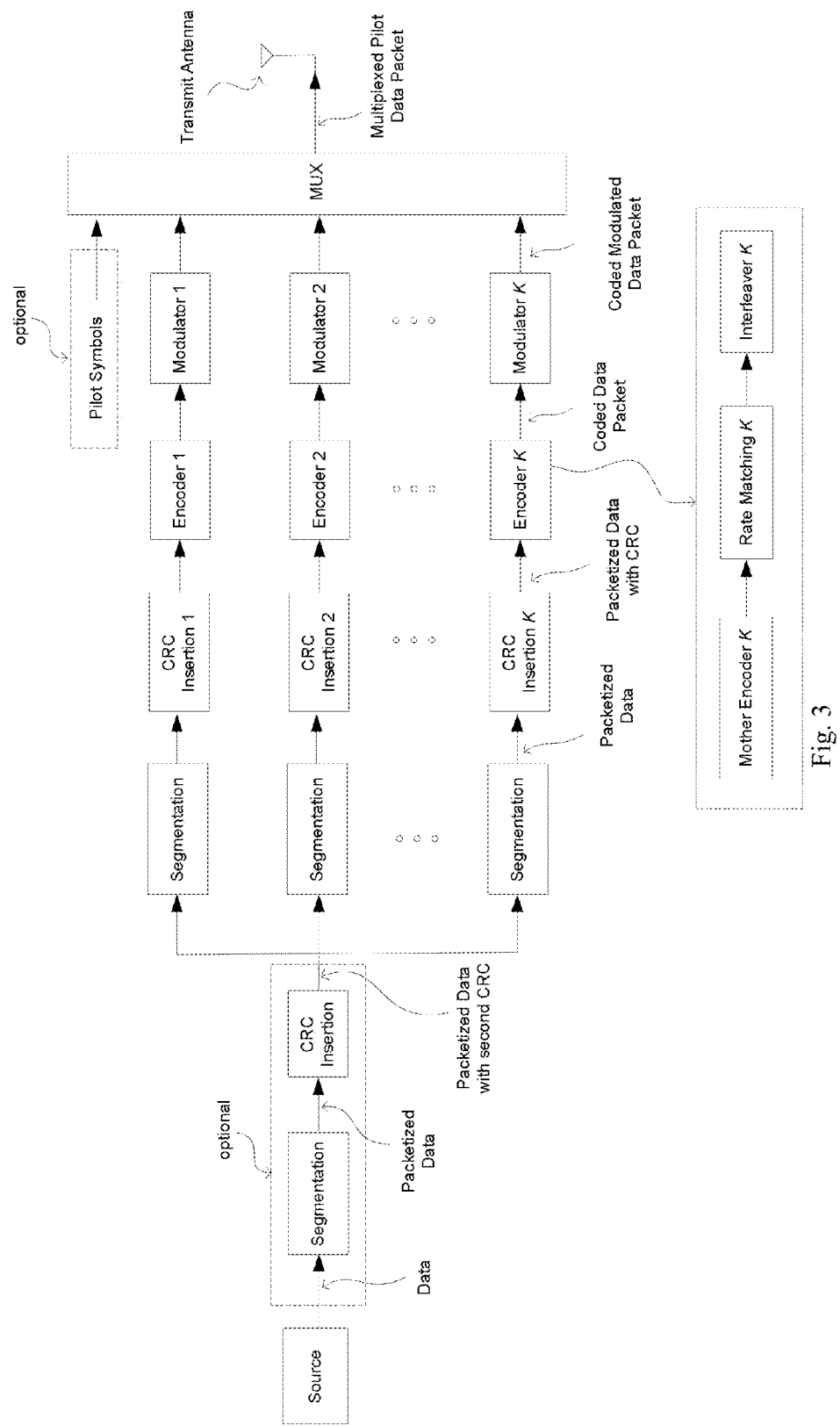
FIG. 3 illustrates a block diagram of a transmitter according to an embodiment of the present patent application.

FIG. 3 illustrates an embodiment of a transmitter method according to the present patent application. At the transmitter side, the transmission data (i.e. data for transmission) are first segmented and initial bits are used to add error-detection capability, for example in a form of cyclic redundancy check (CRC) or any other error detection codes. The CRC check is generally a part of communication systems and the main purpose of CRC is to let the receiver verify whether a decoded data packet is correct or erroneous. The segmented data with CRC then are segmented to smaller packets. In the illustrated transmitter there is K>1 data packets are generated and processed in parallel. Each data packet is encoded in conventional fashion. In this example it is assumed that the data is generated from a single source, but the method is applicable to cases with multiple data sources. The information bits are firstly grouped using the segmentation block and then additional bits are added to each information block. In this case additional bits are used to add error-detection capability, e.g., in a form of cyclic redundancy check (CRC) according to an embodiment of the patent application. The CRC may be the packet-specific and may differ from those used for other parallel packets. However, according the present patent application the CRC or any other error detection code are also utilized for a new purpose which allows enhancing the channel estimation capability as later outlined in the receiver structure.

After the CRC encoding, each information block are passed to an optional channel encoder, with error correction capability (ECC), to generate a block of coded bits (i.e., coded packet with CRC). The depicted encoder block in FIG. 3 typically compromises a mother error correction coder followed by rate matching and possibly a bit-interleaver. The coded information packet is thereafter passed to a modulator that generates a coded modulated packet.

Other packets are processed in a similar fashion as the first packet in parallel processing streams. However, the other packets may have variable code rates with possibly different modulation orders or bit-to-symbol mappings. Different error coding rates can be obtained by two main approaches:

changing the mother code or performing a rate matching. The rate matching can be accomplished by puncturing (to shorten the mother codeword) or repetition (to extend the mother codeword) which is well known in the art.

Having generated coded symbols for each parallel stream, the coded symbols with, in this case, predefined pilot symbols are multiplexed together. The multiplexing scheme should be designed in a fashion that enables improved channel estimation at the receiver side. In the proposed method, the pilot symbols are optional and the system design allows removing legacy pilot symbols which means increased throughput and reduced overhead.

The present multiplexer should be designed in way that the decoded "earlier" packets at the receiver can be utilized for allowing improved channel estimation, i.e., the channel estimator at stage j, utilizes the modulated symbols of the subset of correctly decoded packets from packet 1 to j−1 in order to re-estimate the channel at the receiver. The estimated channel in its general from can be written as, $$\hat{h}_j = f_j(x_p, \mathbb{I}\{x_{d_1}, x_{d_2}, \ldots, x_{d_{j-1}}\})$$

where $f_j$ denotes a channel estimator where it uses the legacy pilot symbols $x_p$ (if there any), and the correctly modulated data symbols of the earlier packets $$x_{d_1}, x_{d_2}, \ldots, x_{d_{j-1}}.$$

The channel estimator may be chosen according different preferences but two main options are minimum mean square error (MMSE) and maximum likelihood (ML) estimators according to an embodiment of the patent application. Here $\mathbb{I}\{x_{d_1}, x_{d_2}, \ldots, x_{d_{j-1}}\}$ denotes an indicator function which selects the modulated symbols of the correctly decoded packets. The selection is done based on the error detection capability for example using the CRC check. The multiplexing should be performed such that the quality of the estimated channel gain $\hat{h}_j$ improves on average as j increases.

To design an efficient multiplexing scheme, the transmitter may use long term statistic of the channel, such as the coherence time and coherence bandwidth of the channel, to determine how many parallel packets, which data rates, and how many symbols of each packet should be multiplexed within each coherence time and coherence bandwidth.

Hence, to enhance the quality of the channel estimation following rule of thumb may be considered for multiplexing at the transmitter.

The coded modulated symbols of packet j should be placed in proximity of the coded modulated symbols of packets 1 to j−1 and the legacy pilot symbols if there are any. This ensures that the channel affected by coded modulated symbols of earlier packets is correlated enough such that the receiver is able to perform enhanced channel estimation for the next packets. Proximity means according to an embodiment of the patent application the same coherence time $T_c$ and/or the same coherence bandwidth $B_c$ of the radio channel.

One particular design choice is that the multiplexer operates in way that the multiplexed coded modulated symbols and legacy pilot symbols span the same coherence time and bandwidth. That is, for a given time-frequency frame of the size of coherence time $T_c$ and/or bandwidth $B_c$ there exist coded modulated symbols of several packets. This way the quality of the channel estimation can be refined for the next packets.

To ensure robust channel estimation for earlier packets, in addition to the optimized placement in the time-frequency grid, one may optimize the packet length, the associated data rate, the number of coded modulated symbols placed within each coherence bandwidth and time according to another embodiment of the patent application.

The placement of the coded modulated symbols of earlier packets in the time-frequency grid when multiplexing should be accomplished such that it alleviates the amount interference from neighbouring nodes that use the same time-frequency resources. One particular guideline is to utilize the structure of the reference symbols and the control region of neighbouring nodes to place the coded modulated symbols of the first packet to avoid a potential interference and to enable initial robust channel estimation. In cases when there are feedback signals from the receiving nodes, the placement of the modulated coded symbols may be adapted dynamically. This hence paves the way for a more flexible radio transmission. In other words, the proposed scheme may be incorporated by the network scheduler that also schedules the radio resources for improved channel estimation.

For radio links with given coherence bandwidth and time (which can be obtained via the long term statistics of the channel) it is in general beneficial to increase the number of coded modulated symbols placed within each coherence bandwidth and time as the number of parallel packets increases.

For the communication systems in which there are no legacy pilot symbols, according to the present patent application the first packet should be decoded blindly and then the next packet can be decoded coherently by estimation the channel gain using the data symbols of the earlier data packets. So the system may design the first packet to take the role of legacy pilots. This solution may be useful for the case when conventional legacy pilot symbols require substantial overhead as it is envisaged in e.g. massive Multiple-Input Multiple-Output (MIMO) radio links. In the case of MIMO, the pilot expansion at the receiver should only contain those symbols that are transmitted from the same antenna port according to another embodiment of the patent application.

In the following disclosure illustrative examples of multiplexing of pilot and data symbols according to the present patent application for both single-carrier and multi-carrier systems are discussed.

Single-Carrier Time-Multiplexing (SCTM)

In SCTM, the coded modulated symbols with pilot symbols should be multiplexed together such that different coded symbols span correlated channel. One typical measure is to use the coherence time of the channel as mentioned earlier. The coherence interval indicates over how many symbols the channel stays unchanged. The coherence interval depends on the mobility of users. The faster the user move, the smaller the coherence interval will be, and vice versa. If the coherence time of the channel is $T_c$, then one potential solution is to use at least one pilot symbol and at most $T_c-1$ coded symbols belong to different coded packets.

Figure 4:
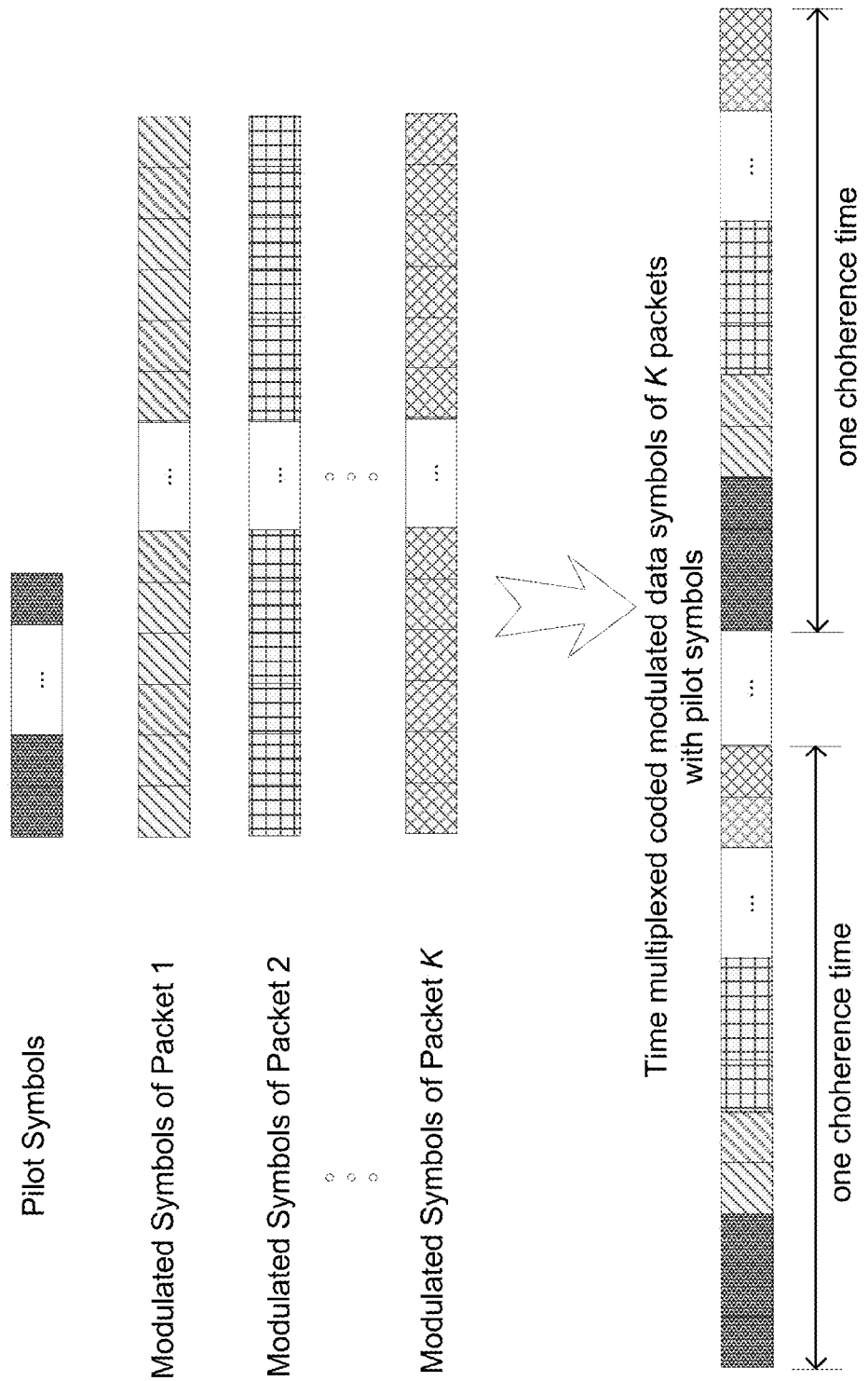
FIG. 4 illustrates an example of SCTM.

However, the system can optimize the system performance which depends on the channel parameters, number of users, mobility, etc., by adjusting the degrees of freedom of the number of parallel streams, number of the pilots and data symbols, and the associated mapping in coherence time. Therefore, in general the system can allow variable number of coded modulated symbols from different packets in each coherence time. FIG. 4 depicts an example of the symbol multiplexing based on the coherence interval of the radio channel.

Multi-Carrier Time-frequency Multiplexing (MCTFM)

Figure 5:
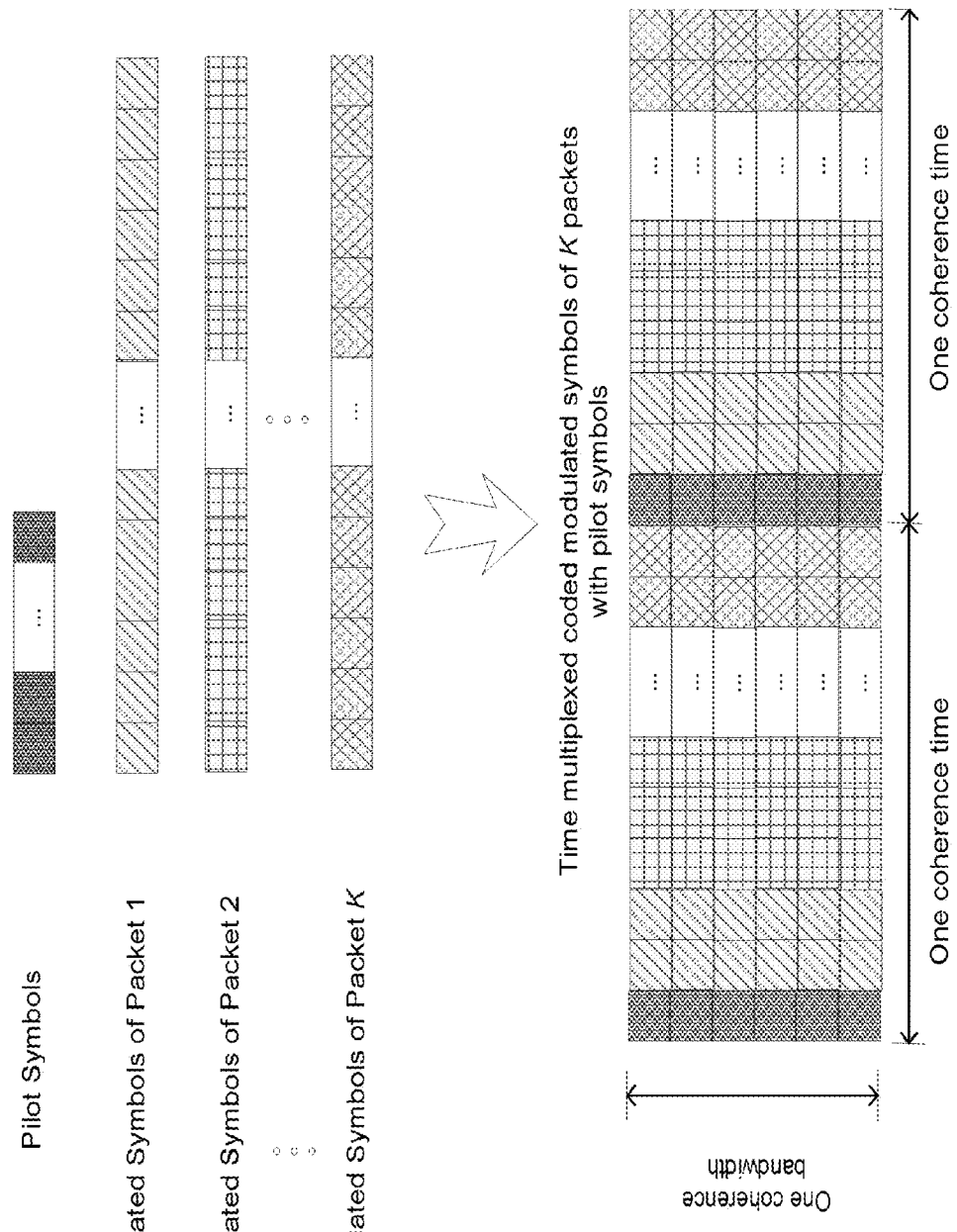
FIG. 5 illustrates an example of MCTFM.

The multiplexing according to the present patent application can be also done in multi-carrier fashion. FIG. 5 depicts an example of multi-carrier time-frequency multiplexing. In this case the coded symbols with pilot symbols are multiplexed together such that different coded symbols span one resource block. One typical measure is to use a resource block of size of the coherence time and the coherence bandwidth of the channel. Further, the system can optimize the placement of coded symbols in both time and frequency grid. The placement as well as the density of pilot and coded symbols along with the number of the parallel coded packets can be optimized based on the channel parameters, data rate, number of users, mobility, etc. Therefore, similar to the single carrier case, in general the system can allow for variable number of coded symbols in each coherence interval. Hence, at least one pilot symbol and at most $B_c T_c - 1$ number of modulated symbols belongs to different modulated data packets according to an embodiment of the patent application.

Figure 6:
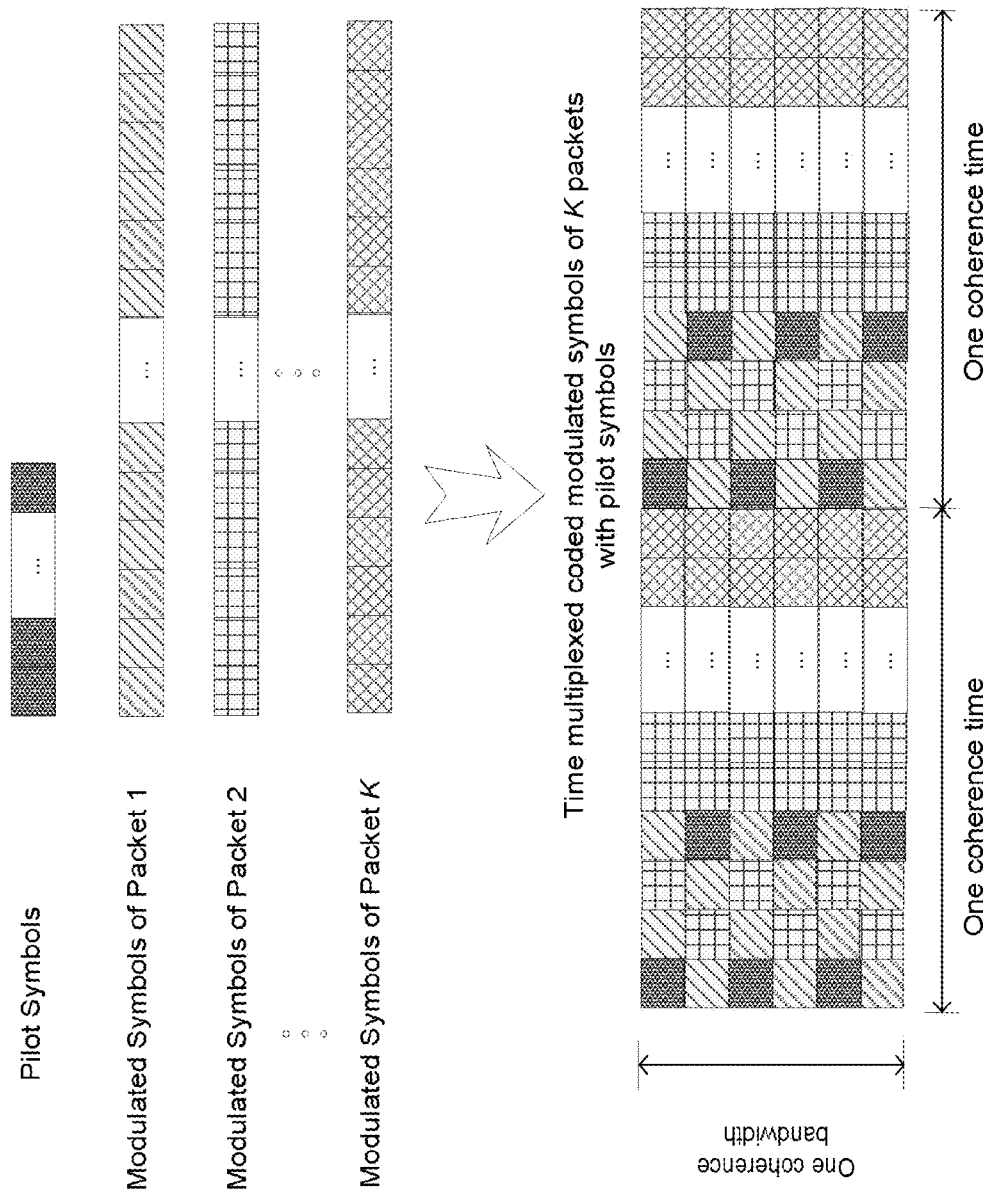
FIG. 6 illustrates another example of MCTFM.

FIG. 6 illustrates another example of the symbol multiplexing with alternatively mapped coded modulated symbols. Another possible solution is to use neighbourhood-filling where the modulated symbols of parallel stream j are placed such that it provides the maximum channel correlation to the modulated symbols of parallel stream (j−1) in both time and frequency. In the case of MIMO, spatial correlation may additionally be considered.

Figure 7:
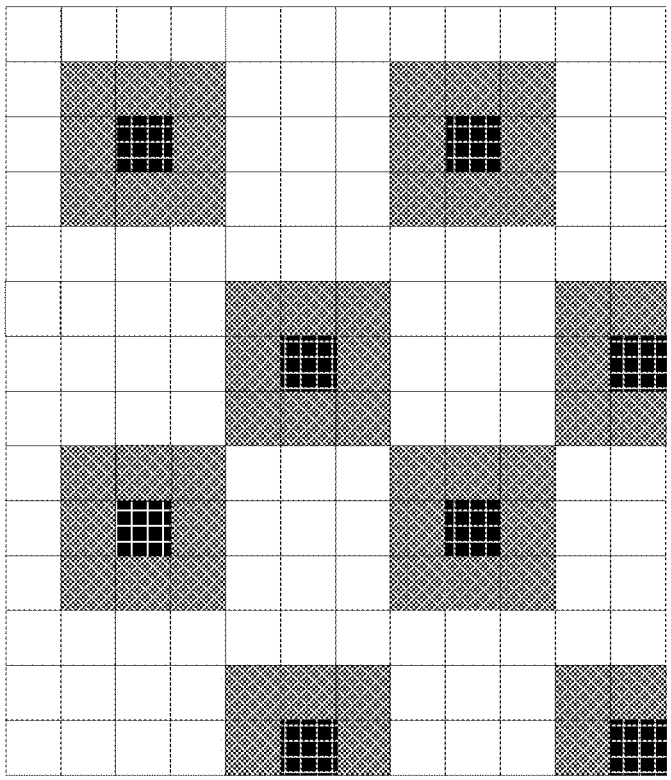
FIG. 7 illustrates yet another example of MCTFM.

FIG. 7 shows a LTE frame size with 8 legacy pilot symbols and two multiplexed packets. The coded modulated symbols of the first packet are mapped to the resource elements (REs) in the neighbourhood of the legacy pilot symbols and the remaining resource elements are used to transmit the coded symbols of the second packet. Alternatively, the system may remove the legacy pilot symbols and use three packets instead of two packets such that the first packet plays the role of the legacy pilot symbols for the next two packets.

Receiver

Figure 8:
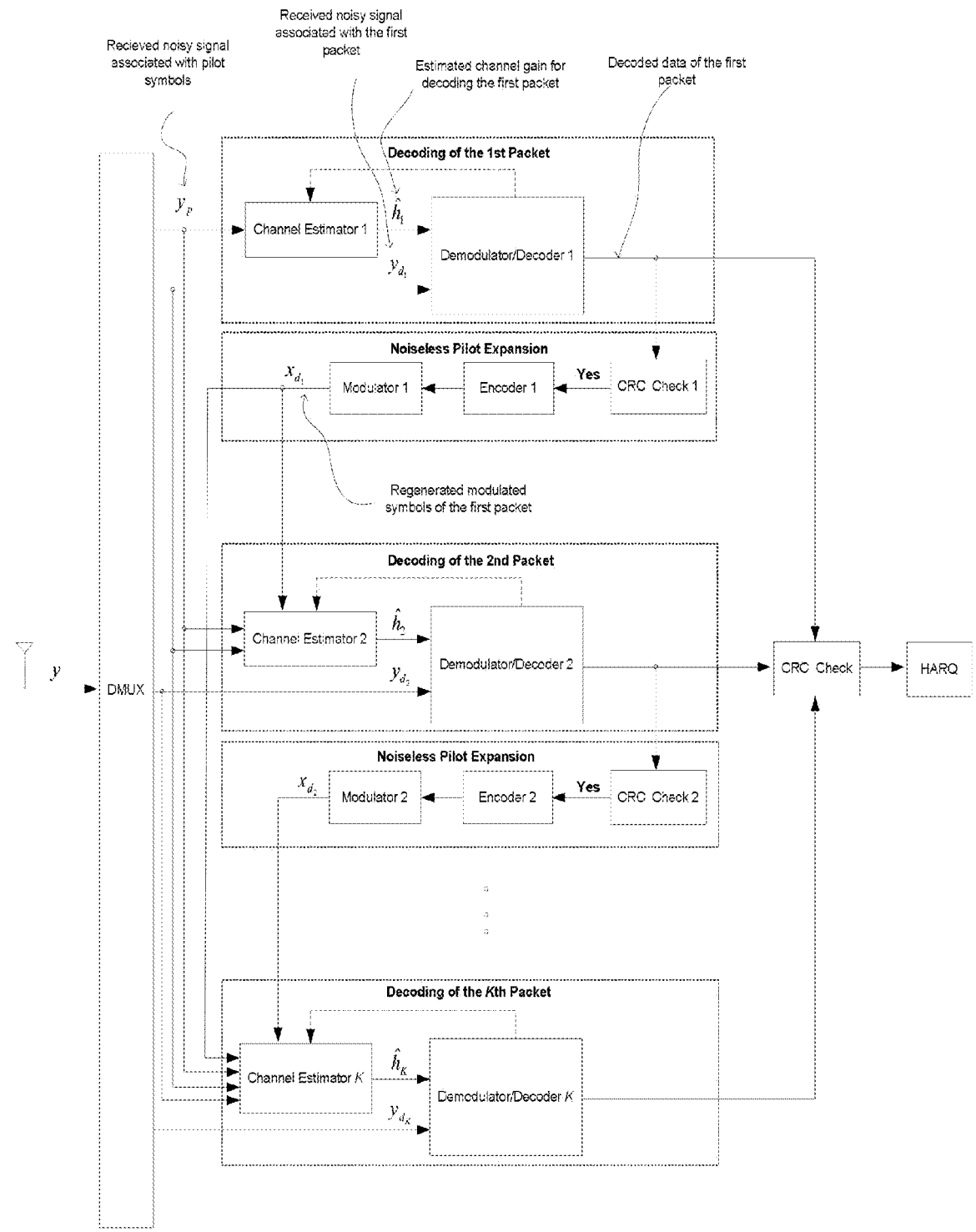
FIG. 8 illustrates a block diagram of a receiver according to an embodiment of the present patent application.

In this section the receiver according to the present patent application is more closely described. The receiver has two main components. It is designed to use a sequential decoding along with progressive noiseless pilot expansion for improved channel estimation. FIG. 8 shows a block diagram of a receiver according to an embodiment of the present patent application.

The receiver firstly employs a demultiplexer to decompose the received noisy baseband signal associated with the transmitted pilot symbols (if there are any) and each modulated data symbols. However, in this example it is assumed that pilot symbols are employed. Using the known pilot symbols and the received noisy copy of the pilot symbols, the first channel estimator obtains an estimate of the radio channel. The estimated channel is then used as side information for the first decoder to decode the first packet. The decoded packet is then fed to the CRC check to verify if the decoded packet is decoded correctly. In case there are no pilot symbols, the channel may be estimated blindly or based on the long-term statistic of the channel, or alternatively differential modulation with non-coherent detection can be used for the first stream.

If the CRC check is correct, the decoded information bits are then re-encoded (if error correction encoding is employed at the transmitter) and re-modulated in order to be used as a new pilot symbols for the next packet. The initial pilot symbols and the coded symbols of the second packet are together utilized to re-estimate the channel. The new estimate of the radio channel has an enhanced quality due to the fact that a higher number of pilot symbols (including the original ones as well as the modulated symbols of the first packet) are used for the channel estimation.

The improvement by the patent application mainly comes in two ways: on one hand the effect of the measurement noise is reduced which allows the channel experienced by the pilot symbols to be estimated more accurately; and on the other hand, since the number of pilot symbols are increased the actual channel experienced by the pilot symbols become more correlated to those experienced by the data symbols. The later fact combats the channel out-dating and is important in fast-varying radio channels. Therefore, the second channel estimate has a higher correlation to the actual radio channel experienced by the coded symbols of the second transmitted packet. This enables the second decoder to access an improved channel estimate and hence the performance of the second decoder becomes closer to that with perfect knowledge of the radio channel.

In the present method, since the receiver employs the CRC check, the error propagation to the second channel estimator is avoided. If the first decoded packet does not check the CRC, the receiver may initiate ARQ to retransmit the first packet. In this case the transmitter retransmits the packet until the receiver decodes first packet correctly. The decoded packet can then be used to recover the coded symbols to be used at the second channel estimator. Therefore, the initial packet needs to be stored in a suitable buffer. The storage of the earlier erroneous packets exists in systems that employ ARQ with soft combining. For cases when the delay is a performance constraint or the receiver decides to drop the erroneous packet, the second decoder may only use the original pilot symbols for the channel estimation. In cases the transmission of the CRC per packet is expensive the receiver may request the CRC based on the larger combined packet as the two-level CRC in the transmitter is considered.

The third decoder, in a similar fashion to the second decoder, decodes the third received packet but uses the coded symbols of the first and the second packets as expanded pilot symbols for the channel estimation.

Finally, the Kth channel estimator uses the pilot symbols with a subset of all correctly detected (K−1) coded symbols to decode the last transmitted packet. Again, in cases some packets do not check the CRC, the receiver may initiate ARQ, or it may only use a fraction of the decoded packets that check the CRC in case the quality of the channel estimate is already good enough. The channel estimator at stage j might only use a small subset of the modulated symbols of the correctly decoded of earlier packet up to packet (j−1) to reduce the complexity of the channel estimation.

As the receiver performs the sequential decoding according to the patent application, the "next decoder" in the sequel sees an improved channel gain estimate. This means that lower channel estimation noise is fed to the demodulator (and spatial filters in case of MIMO) and the decoder and the decoder can more often successfully decode the packet. Thus, in the present method, the transmitter may also increase the rate of the packets. The transmitter may choose different transmission rates. That is, the first packet, the packet which is decoded with a lower quality channel estimate, carries a lower rate and the second decoder carries a higher data rate so the data rate can be increased for each subsequent transmitted data packet. In this way the probability of the successful decoding of the first packet increases and the channel estimation for next decoder improves more often. However, if the transmitter keeps the rate unchanged over all data packet streams, the later packet can be successfully decoded more often. Thus, the effective throughput improves even for the case with constant rate transmission. In particular, the present patent application is beneficial in several ways as outlined below.

Flexible Transmission

For example, the current 3GPP LTE system is optimized for low speed users. This results in certain pilot symbol density and patterns. However, to allow a wider range of users with different mobility conditions to enjoy reliable channel estimation the transmission data frame should be adapted. The solution according to the patent application provides a way to allowing different users enjoying different degrees of reliability in channel estimation based on their requirements. The present method facilies this via variable-rate transmission where lower-rate data packets are embedded in higher-rate data packets such that in high mobility case the lower rate packets can be decoded and reused as additional pilots.

Enhanced Robustness

The present method is designed in a manner that provides un-equal error protection against the channel estimation noise. That is, the decoded packets in later stages enjoy better channel estimation quality and hence the associated decoders see less effective estimation noise. This means that the scheme can decode more sensitive data later to ensure a lower block error rate.

Improved Data Rate

The present method can also be utilized such that it improves the transmission data rate. It is noted that as the decoding evolves at the receiver the performance of the channel estimation improves and the associated block error rate performance for packets later in the decoding sequence (with increasing index j) enhances. The transmitter can hence increase the transmission rate of the packets later in the decoding sequence and yet be able to keep the block error rate unchanged since the effective estimation noise is less. The rate can e.g. be increased in three ways, changing the rate of the mother code, performing the rate matching, or changing the modulation order.

Decreased Overhead

The present method generates noiseless pilot symbols as the decoding evolves, hence another application of the present method is to use lower number of legacy pilot symbols for the decoding of the first packet and ensure successful decoding of the first packet. Then the other packets see an expanded number of pilot symbols, i.e. including the legacy and coded symbols of earlier packets.

One exemplary application of the present patent application is the following. In a wireless communication system there are usually two types of reference signals: measurement reference signals (RS) and demodulation RS. The density of measurement RS is generally less as compared to the density of demodulation RS. One example in which the present patent application can be applied is the following. The system can keep measurement RS to acquire the initial channel estimation in order to decode the first packet. Having decoded the first packet, the transmitted coded modulated symbols of the first packet can be then used as a demodulation RS for decoding of the other packets. In this way the overhead is reduced due to demodulation RS, which improves the overall spectral efficiency of the system. This solution is applicable if the measurement signal is transmitted from the same antenna port as that the coded modulated data symbols.

Figure 9:
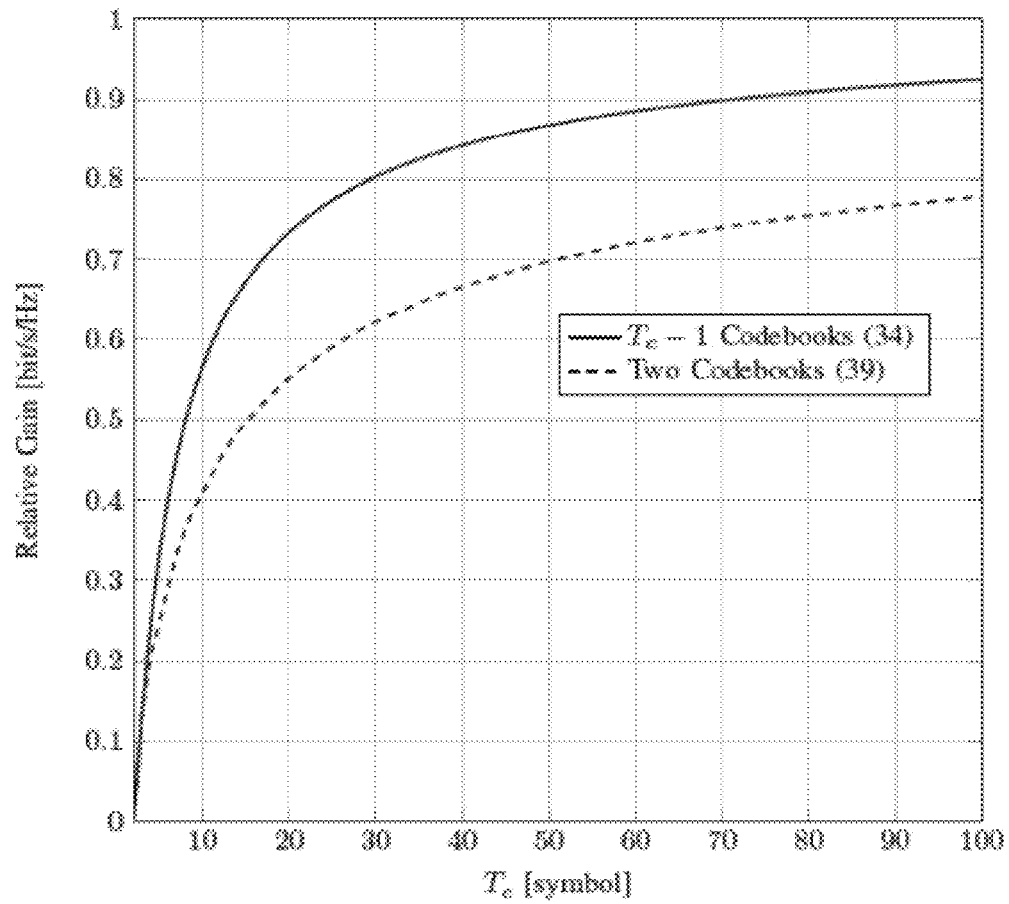
FIG. 9 shows the performance gain of the present patent application.

FIG. 9 shows an example of the performance gain over the baseline single-rate codebook when the scheme is used over wireless link with coherence time $T_c$ for two codebooks (i.e., K=2), and $T_c-1$ codebooks (i.e., K=$T_c$-1), where $T_c$ is the coherence time of the channel normalized by the symbol duration.

Moreover, as understood by the person skilled in the art, any method according to the present patent application may also be implemented in a computer program, having code means, which when run by processing means causes the processing means to execute the steps of the method. The computer program is included in a computer readable medium of a computer program product. The computer readable medium may comprises of essentially any memory, such as a ROM (Read-Only Memory), a PROM (Programmable Read-Only Memory), an EPROM (Erasable PROM), a Flash memory, an EEPROM (Electrically Erasable PROM), or a hard disk drive.

Furthermore, the present method in a transmitter and a receiver can be implemented and executed in suitable transmitter and receiver communication devices, respectively. It is realized by the skilled person that the present transmitter and receiver devices may comprise the necessary communication capabilities in the form of e.g., functions, means, units, elements, etc., for executing the methods according to the patent application which means that the devices can be modified, mutatis mutandis, according to any method of the present patent application. Examples of other such means, units, elements and functions are: memory, encoders, decoders, mapping units, multipliers, interleavers, deinterleavers, modulators, demodulators, inputs, outputs, antennas, amplifiers, DSPs, etc. which are suitably arranged together. Examples of transmitter and receiver devices are base stations (such as eNB), mobile devices (such as UEs), relay devices, remote radio heads, hyper transmitters-receiver, virtual transmitters-receiver, coordinated multi-point transmitters-receiver, etc.

Especially, the processors of the present devices may comprise, e.g., one or more instances of a Central Processing Unit (CPU), a processing unit, a processing circuit, a processor, an Application Specific Integrated Circuit (ASIC), a microprocessor, or other processing logic that may interpret and execute instructions. The expression "processor" may thus represent a processing circuitry comprising a plurality of processing circuits, such as, e.g., any, some or all of the ones mentioned above. The processing circuitry may further perform data processing functions for inputting, outputting, and processing of data comprising data buffering and device control functions, such as call processing control, user interface control, or the like.

Figure 10:
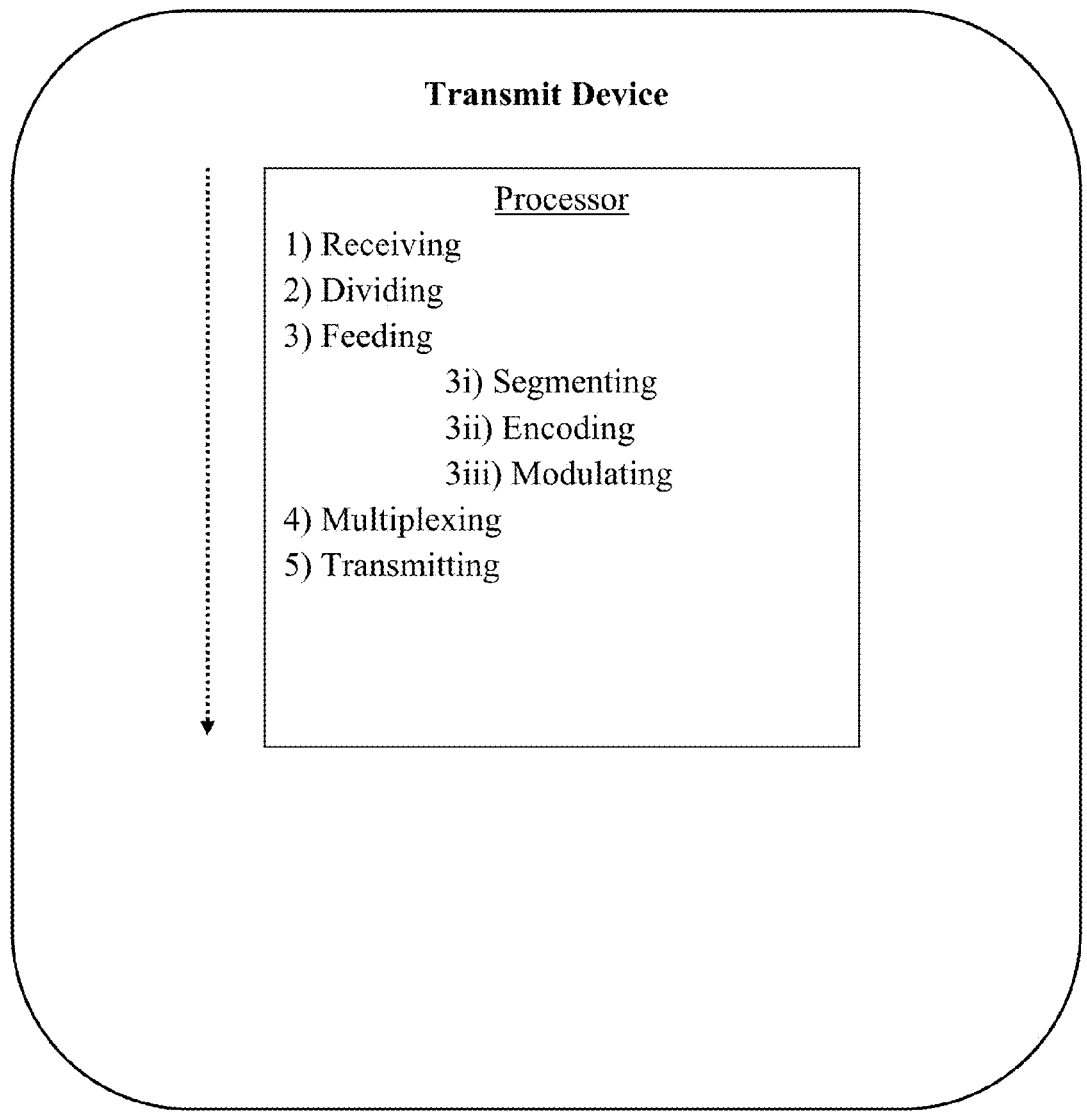
FIG. 10 shows a transmit device according to an embodiment of the present patent application.

The present transmitter devices comprise a processor which is arranged to execute the steps in the transmission method according to the present patent application. This embodiment is illustrated in FIG. 10 in which the receiver comprises a processor arranged for executing the different steps of the present method as indicated by the arrow in FIG. 10.

Figure 11:
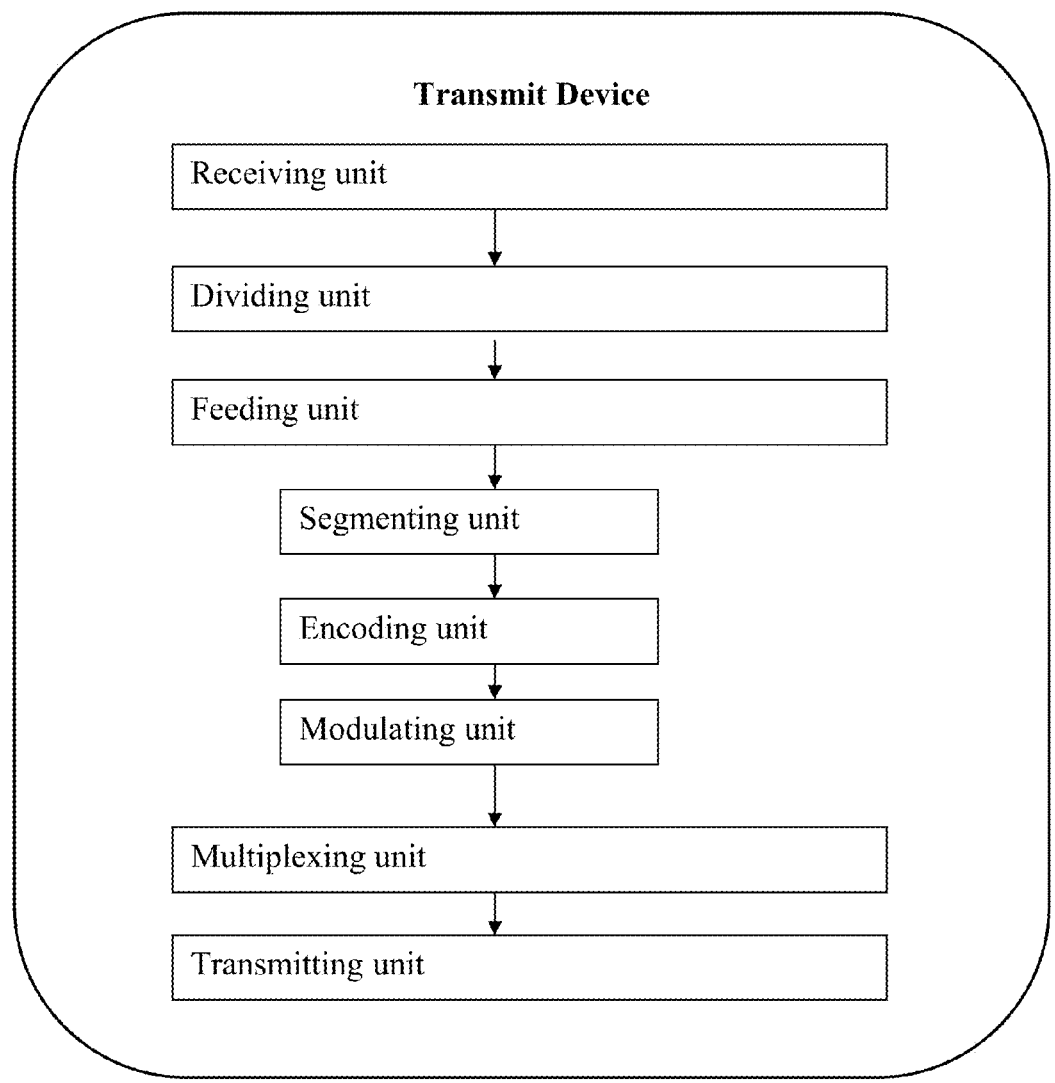
FIG. 11 shows an alternative transmit device according to an embodiment of the present patent application.

Alternatively, according to another embodiment of the patent application the present transmitter device comprises dedicated units for the performance of the method steps. This embodiment is illustrated in FIG. 11 in which the receiver comprises dedicated units for the corresponding method steps. The device according to this embodiment comprises a receiving unit, a dividing unit, a feeding unit, a multiplexing unit and a transmitting unit; and each parallel processing stream comprises a segmenting unit, an encoding unit and a modulating unit.

Figure 12:
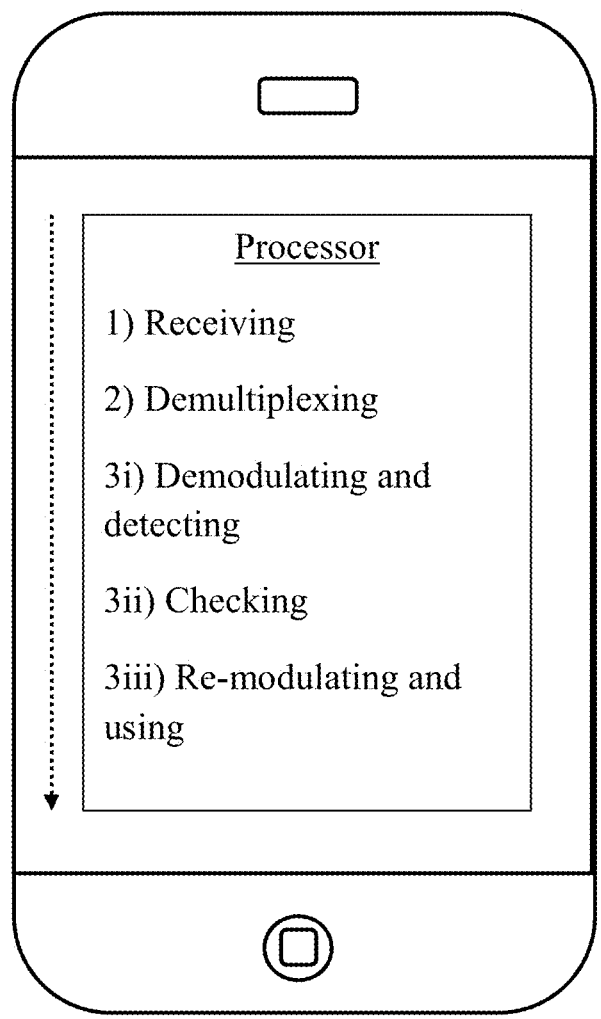
FIG. 12 shows a receiving device according to an embodiment of the present patent application.

The present receiver devices comprise a processor which is arranged to execute the steps in the receiver method according to the present patent application. This embodiment is illustrated in FIG. 12 in which the receiver comprises a processor arranged for executing the different steps of the present method as indicated by the arrow in FIG. 12.

Figure 13:
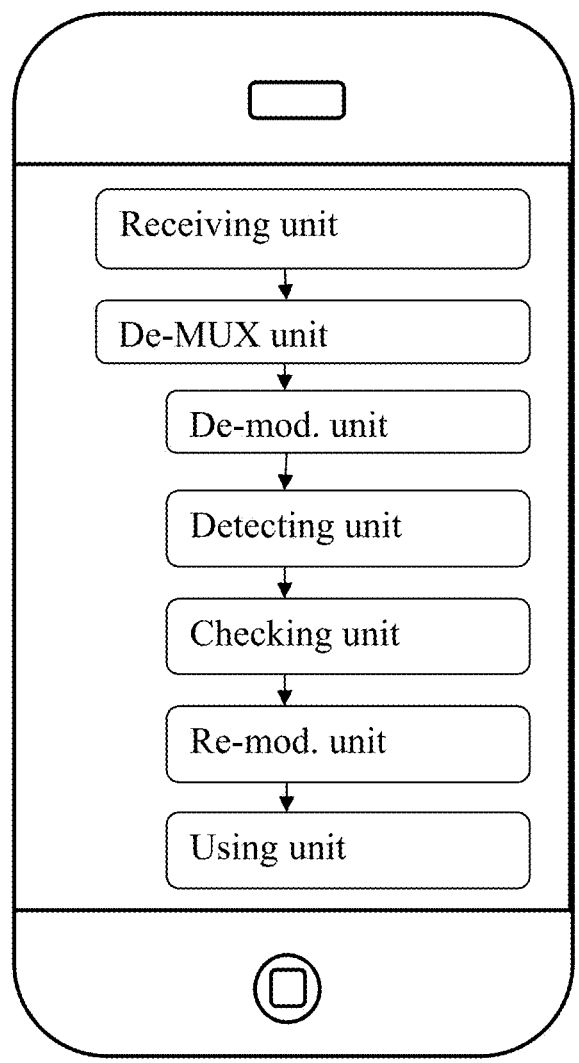
FIG. 13 shows an alternative receiving device according to an embodiment of the present patent application.

Alternatively, according to another embodiment of the patent application the present receiver device comprises dedicated units for the performance of the method steps. This embodiment is illustrated in FIG. 13 in which the receiver comprises dedicated units for the corresponding method steps. The device according to this embodiment comprises a receiving unit, a demultiplexing (De-MUX) unit, a demodulating unit (De-mod.), a detecting unit, a checking unit, a re-modulating unit, and a using unit.

The present cellular system in which the present method may be used is a 3GPP system, such as LTE or LTE Advanced, or any other suitable cellular system, which is well understood by the skilled person.

Finally, it should be understood that the present patent application is not limited to the embodiments described above, but also relates to and incorporates all embodiments within the scope of the appended independent claims.

What is claimed is:

1. A method for transmitting data in a wireless communication system, the method comprising:
    receiving transmission data;
    dividing the received transmission data into K >1 data streams, where K is a positive integer;
    feeding each data stream into its associated parallel processing path so as to obtain K modulated data packets $j=1, \ldots, K$ from the parallel processing paths, wherein in each processing path the method further comprises:
    segmenting the data stream;
    encoding the segmented data stream with a first error detection code; and
    modulating the error detection encoded segmented data stream so as to obtain a modulated data packet j comprising a plurality of modulated symbols, wherein the segmented data streams are individually encoded;
    multiplexing the K modulated data packets so that at least one modulated symbol of each modulated data packet j are placed in proximity to each other in time and/or frequency; and
    transmitting the multiplexed modulated data packets over a radio channel of the wireless communication system,
    wherein the wireless communication system is a Multi-Carrier Time-frequency Multiplexing (MCTFM) system,
    wherein a plurality of pilot symbols is multiplexed in proximity to the modulated symbols of the K modulated data packets,
    wherein at least one pilot symbol and at most $B_cT_c-1$ modulated symbols belong to different modulated data packets, and
    wherein $T_c$ is a coherence time and $B_c$ is a coherence bandwidth.

2. The method according to claim 1, wherein each processing path further comprises encoding the error detection encoded segmented data stream with an error correction code.

3. The method according to claim 1, wherein multiplexing comprises multiplexing the modulated symbols of the K modulated data packets together with a plurality of channel estimation pilot symbols.

4. The method according to claim 1, wherein proximity comprises the same coherence time $T_c$ and/or the same coherence bandwidth $B_c$ of the radio channel.

5. The method according to claim 1, wherein multiplexing comprises placing at least one modulated symbol from the modulated data packet j in proximity to at least one modulated symbol of each modulated data packets 1 to j−1.

6. The method according to claim 1, further comprising, before dividing, encoding the received transmission data with a second error detection code.

7. The method according to claim 6, wherein the first and/or the second error detection code is a Cyclic Redundancy Check (CRC) code.

8. The method according to claim 1, wherein the multiplexed modulated data packets are transmitted over a Multiple-Input Multiple-Output (MIMO) channel.

9. The method according to claim 1, wherein a transmission rate for the modulated data packets j increases with increasing value for j.

10. The method according to claim 9, wherein the increased transmission rate is selected from one or more methods selected from the group consisting of changing rate of the error correction code, performing rate matching, and changing a modulation order.

11. A method for receiving data in a wireless communication system, the method comprising:
    receiving at least one communication signal comprising multiplexed modulated data packets;
    de-multiplexing the multiplexed modulated data packets so as to obtain K modulated data packets, wherein the multiplexed modulated data packets comprise j=1 to K packets;
    demodulating and detecting a first modulated data packet so as to obtain a first data packet;
    determining whether the first data packet is a correct data packet by an error detection determination;
    re-modulating the first data packet in order to use the re-modulated first data packet for channel estimation of a second modulated data packet, when the first data packet is correct;
    demodulating and detecting the second modulated data packet so as to obtain a second data packet;
    determining whether the second data packet is a correct data packet by an error detection determination;
    re-modulating the second data packet in order to use the re-modulated data second packet for channel estimation of a third modulated data packet, when the second data packet is correct; and
    demodulating, detecting, determining and re-modulating each of the j=3 to K−1 data packets according to the principle described with respect to the modulated data packets for j=1, 2,
    wherein the wireless communication system is a Multi-Carrier Time-frequency Multiplexing (MCTFM) system,
    wherein a plurality of pilot symbols is multiplexed in proximity to modulated symbols of the K modulated data packets,
    wherein at least one pilot symbol and at most $B_cT_c-1$ modulated symbols belong to different modulated data packets, and
    wherein $T_c$ is a coherence time and $B_c$ is a coherence bandwidth.

12. The method according to claim 11, further comprising initiating Automatic Repeat Request (ARQ) for the jth data packet when the jth data packet is not a correct data packet.

13. A method for transmitting and receiving data in a wireless communication system, the method comprising:
    receiving, by a transmitter, transmission data;

dividing, by the transmitter, the received transmission data by the transmitter, into K>1 data streams, where K is a positive integer;
feeding each data stream, by the transmitter, into its associated parallel processing path so as to obtain K modulated data packets j=1, . . . , K from the parallel processing paths, wherein in each processing path the method further comprises:
  segmenting the data stream;
  encoding the segmented data stream with a first error detection code; and
  modulating the error detection encoded segmented data stream so as to obtain a modulated data packet j comprising a plurality of modulated symbols, wherein the segmented data streams are individually encoded;
multiplexing, by the transmitter, the K modulated data packets so that at least one modulated symbol of each modulated data packet j are placed in proximity to each other in time and/or frequency; and
transmitting, by the transmitter, the multiplexed modulated data packets over a radio channel of the wireless communication system;
receiving, by a receiver, at least one communication signal comprising the multiplexed modulated data packets;
de-multiplexing, by the transmitter, the multiplexed modulated data packets so as to obtain the K modulated data packets, wherein the multiplexed modulated data packets comprise j=1 to K packets;
de-modulating and detecting the jth modulated data packet so as to obtain the jth data packet;
checking whether the jth data packet is a correct data packet by an error detection check; and
re-modulating the jth data packet and using at least one of the previously re-modulated jth data packet, for j =2 to K, for channel estimation, demodulation and detection of the (j+1)th modulated data packet when the jth data packet is correct,
wherein the wireless communication system is a Multi-Carrier Time-frequency Multiplexing (MCTFM) system,
wherein a plurality of pilot symbols is multiplexed in proximity to the modulated symbols of the K modulated data packets,
wherein at least one pilot symbol and at most $B_c T_c - 1$ modulated symbols belong to different modulated data packets, and
wherein $T_c$ is a coherence time and $B_c$ is a coherence bandwidth.

14. A non-transitory computer program product comprising a computer readable medium and a computer program stored thereon according to claim 13, wherein the computer program product is selected from the group consisting of: a ROM (Read-Only Memory), a PROM (Programmable ROM), an EPROM (Erasable PROM), a Flash memory, an EEPROM (Electrically EPROM) and a hard disk drive.

15. A transmission device for communication in a wireless communication system, the transmission device comprising a processor configured to:
  receive transmission data;
  divide the received transmission data into K>1 data streams, where K is a positive integer;
  feed each data stream into its associated parallel processing path so as to obtain K modulated data packets j=1, . . . , K from the parallel processing paths, wherein in each processing path the device is further configured to:
    segment the data stream;
    encode the segmented data stream with a first error detection code; and
    modulate the error detection encoded segmented data stream so as to obtain a modulated data packet j comprising a plurality of modulated symbols, wherein the segmented data streams are individually encoded;
  multiplex the K modulated data packets so that at least one modulated symbol of each modulated data packet j are placed in proximity to each other in time and/or frequency; and
  transmit the multiplexed modulated data packets over a radio channel of the wireless communication system,
wherein the wireless communication system is a Multi-Carrier Time-frequency Multiplexing (MCTFM) system,
wherein a plurality of pilot symbols is multiplexed in proximity to the modulated symbols of the K modulated data packets,
wherein at least one pilot symbol and at most $B_c T_c - 1$ modulated symbols belong to different modulated data packets, and
wherein $T_c$ is a coherence time and $B_c$ is a coherence bandwidth.

16. A receiving device arranged for communication in a wireless communication system, the receiving device comprising a processor configured to:
  receive at least one communication signal comprising multiplexed modulated data packets;
  de-multiplex the multiplexed modulated data packets so as to obtain K modulated data packets, wherein the multiplexed modulated data packets comprise j=1 to K packets;
  demodulate and detect a first modulated data packet so as to obtain a first data packet;
  check whether the first data packet is a correct data packet by an error detection check;
  re-modulate the first data packet in order to use the re-modulated first data packet for channel estimation of a second modulated data packet when the first data packet is correct;
  demodulate and detect the second modulated data packet so as to obtain a second data packet;
  determine whether the second data packet is a correct data packet by an error detection determination;
  re-modulate the second data packet in order to use the re-modulated second data packet for channel estimation of a third modulated data packet, when the second data packet is correct; and
  demodulate, detect, determine and re-modulate each of the j=3 to K−1 data packets according to the principle described with respect to the modulated data packets for j=1, 2,
wherein a plurality of pilot symbols is multiplexed in proximity to modulated symbols of the K modulated data packets,
wherein at least one pilot symbol and at most $B_c T_c - 1$ modulated symbols belong to different modulated data packets, and
wherein $T_c$ is a coherence time and $B_c$ is a coherence bandwidth.

* * * * *